Nov. 4, 1969    L. T. STAATS, SR., ET AL    3,475,888
FRUIT PICKER

Filed Aug. 18, 1967    3 Sheets-Sheet 1

INVENTORS
Louis T. Staats, Sr.
Cecil D. Misener &
Frank B. Innis

BY Munson H. Lane
ATTORNEY

Nov. 4, 1969   L. T. STAATS, SR., ET AL   3,475,888
FRUIT PICKER

Filed Aug. 18, 1967   3 Sheets-Sheet 2

INVENTORS
Louis T. Staats, Sr.
Cecil D. Misener &
Frank B. Innis

BY   *Munson H. Lane*

ATTORNEY

Nov. 4, 1969  L. T. STAATS, SR., ET AL  3,475,888
FRUIT PICKER

Filed Aug. 18, 1967  3 Sheets-Sheet 3

INVENTORS
Louis T. Staats, Sr.
Cecil D. Misener &
Frank B. Innis
BY  Munson H. Lane
ATTORNEY

United States Patent Office 3,475,888
Patented Nov. 4, 1969

3,475,888
FRUIT PICKER
Louis T. Staats, Sr., Rte. 1, Lincoln University, Pa. 19352; Cecil D. Misener, 1050 Minnehaha Ave.; and Frank B. Innis, 1020 Minnehaha Ave., Clermont, Fla. 32711
Filed Aug. 18, 1967, Ser. No. 661,649
Int. Cl. A01g 19/00
U.S. Cl. 56—328    14 Claims

ABSTRACT OF THE DISCLOSURE

A mechanical fruit picking head particularly adapted for picking citrus fruit whereby the picker head exerts a pull and twisting motion on the fruit relative to the stem supporting the fruit. The picker head is mounted on an extensible support carried on a mobile platform, and comprises an open top receptacle having a bottom, a front wall, a rear wall and connecting side walls, a picker comb to engage behind the fruit and exert a pull thereon having a plurality of spaced fingers mounted across the open top of the receptacle adjacent the front wall with the picker fingers extending upwardly above the open top, and a power driven rotatable auger mounted across the open top of the receptacle just rearwardly of the picker comb to engage the fruit held by the picker comb and exert a twisting force thereon.

---

This invention relates to apparatus for the mechanical harvesting of fruits and in particular citrus fruits. The invention particularly relates to an improved picker head for mounting on an extensible support carried by a mobile platform, which can be extended into the branches of a tree to engage ripe fruit and exert a lifting, twisting and pulling action thereon relative to the stem attached to the fruit.

It is well known that in picking citrus fruits from the tree a lift, twist, and pull action greatly reduces the effort or power required to remove the fruit from the stem as compared with a straight pull. The straight pull also tends to pull out the stemp plug and to tear the skin of the fruit around the stem, which is undesirable.

It is therefore an object of this invention to provide an improved mechanical fruit picker head which will exert a lift, twist and pull on the fruit relative to its stem.

It is a further object of this invention to provide a picker head having a receptacle into which the picked fruit falls, a picker comb having upstanding fingers mounted across the open top of the receptacle and a power driven rotatable auger mounted rearwardly of the picker comb also across the open top of the receptacle.

It is a further object of this invention to provide an auger for the picker head having a pair of oppositely wound helical conveyor flights mounted on an auger shaft, with means for rotating said auger so that points on the top of the auger are moving rearwardly relative to the end of the picker head being advanced into a tree. The winding of the helical conveyor flights is such that as the auger turns as described the conveying motion of the conveyor flights will be toward the center of the auger. The auger flights will preferably be made of metal rods helically wound to form a cylindrical coil, with the pitch between windings spaced to allow the free passage of the picked fruit, and the free passage of the foliage, blossoms and young fruit through the auger.

It is another object of the invention to mount the picker comb on the picker head for transverse reciprocating motion, with means for selectively reciprocating the picker comb. In some varieties of citrus trees the fruit grows in bunches or clusters and these clusters tend to jam or clog between the picker fingers. In order to eliminate this jamming a provision has been made for separation of these clusters by the reciprocation of the picker fingers across the auger. The reciprocation of the picker comb may be accomplished by various means including electrical, hydraulic, or pneumatic motors. In situations where the reciprocation of the picker comb is not needed, means are provided to shut off the action.

It is a further object to provide in one embodiment of the invention a hinged bottom for the picker head receptacle with power means for opening and closing the bottom so that fruit gathered in the receptacle can be dumped into a suitable container.

It is also an object to provide in another embodiment of the invention a hollow tube extending from the picker head receptacle near its bottom, and a receptacle bottom shaped to funnel fruit toward said hollow tube so that fruit picked by the picker head can be funnelled into the hollow tube through which it will fall by gravity into a flexible chute or other means connected to the hollow tube and be conveyed to a collecting bin on the ground or on a portable platform. It is within the scope of this invention that the hollow tube may form at least one section of a hollow support boom.

In the use of this invention the entire picker head with fingers and auger is projected into tree by means of an articulated support boom, and is selectively placed to pick the fruit to the best advantage. Once placed the picker head is retracted from the tree with an upward, outward, or downward pull of the picker comb. The action of the auger provides a lift action and twist to the fruit held by the picker comb. The combined motion of the picker head as it is being retracted and the twisting motion of the auger provides the preferred method of lift, twist and pull for separating the fruit from the tree. Furthermore, the apparatus of this invention is so designed and clearances are such that the fruit is removed without injury to the tree.

Other features and advantages of the invention will become apparent from the following description taken in conjunction with the drawings in which.

Referring particularly to FIGS. 1 to 5, a picker head 10 constructed in accordance with one embodiment of the invention is shown attached to a hollow tube 11. It is to be understood that the picker head 10 is intended to be supported at the end of a vertically movable support boom which is mounted on a swivel base secured to the load bed of a transport vehicle. There are numerous support booms which are adaptable for use with this invention therefore no attempt has been made to show or to describe one in detail. Suffice it to say that the support boom will preferably be mounted on a turntable or other swivel base secured to the vehicle load bed adapting the support boom to be rotated 360° about a vertical axis. The support boom will also preferably be articulated at several points along its length so that the picker head end of the boom can be elevated in a vertical plane to move the picker head up under the fruit which is to be picked, to engage the fruit in the picker head, and once engaged, to pull the picker head outwardly and up or down from the tree to detach the fruit from the stem on which it grew. The turntable and articulated joints of the boom will preferably be actuated by suitable mechanism powered by hydraulic, pneumatic or electric motors so that an operator at a control point can move the support boom and picker head with facility.

It is a feature of the embodiment shown in FIGS. 1 to 5 that the hollow tube 11 may form the picker head end section of an articulated boom so that it can serve also as a chute through which the picked fruit can travel toward the ground. The end of the tube 11 (not shown) opposite the picker head end, can be connected to a flexible chute which carries the fruit to a suitable collection receptacle on the ground or on a vehicle.

Figure 1:
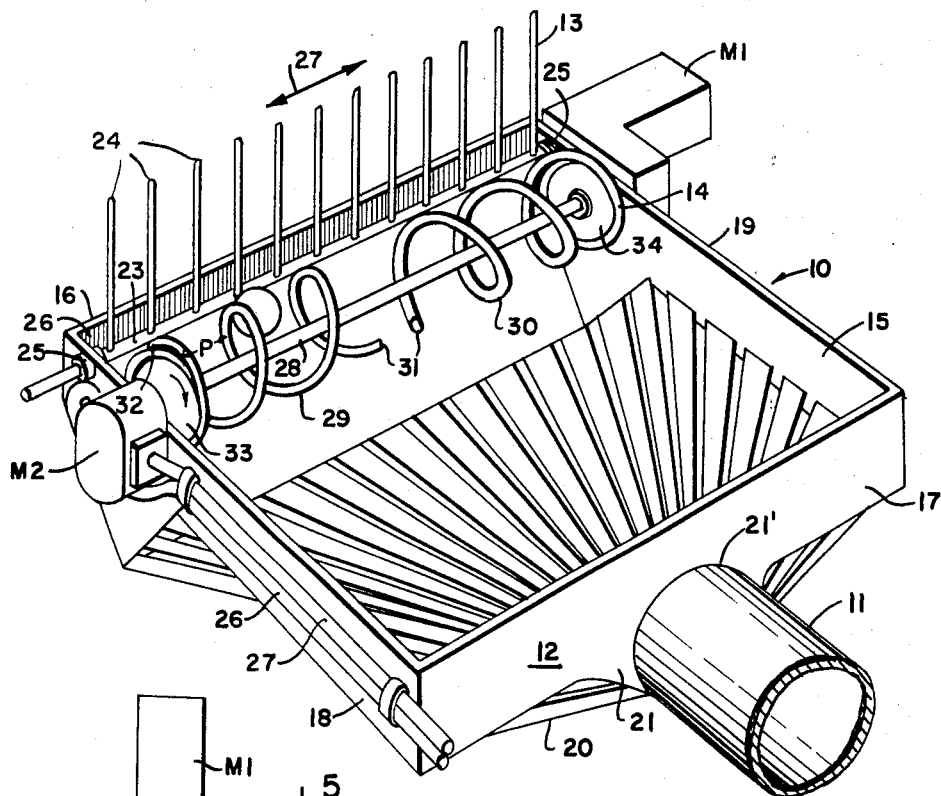
FIG. 1 is a perspective view of a fruit picker head constructed in accordance with the invention.
Figure 2:
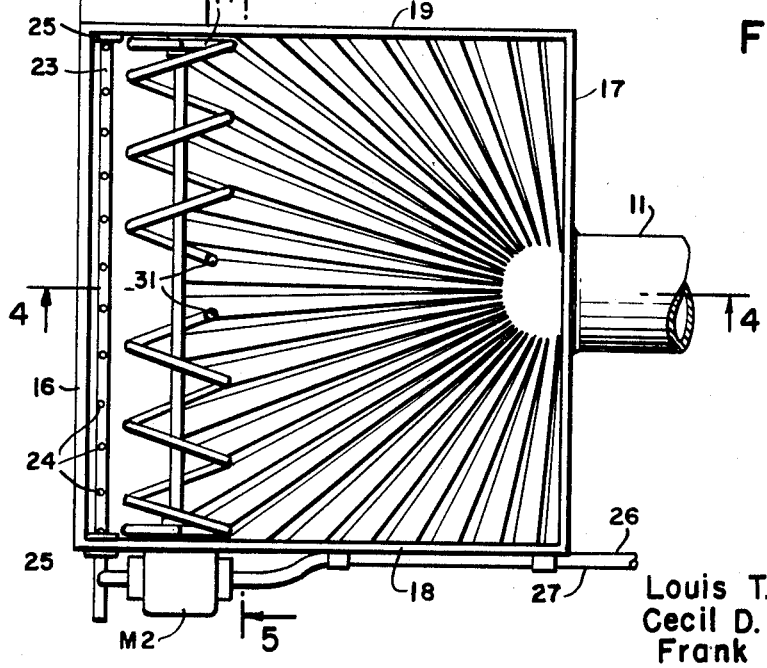
FIG. 2 is a top plan view of the fruit picker head shown in FIG. 1.
Figure 3:
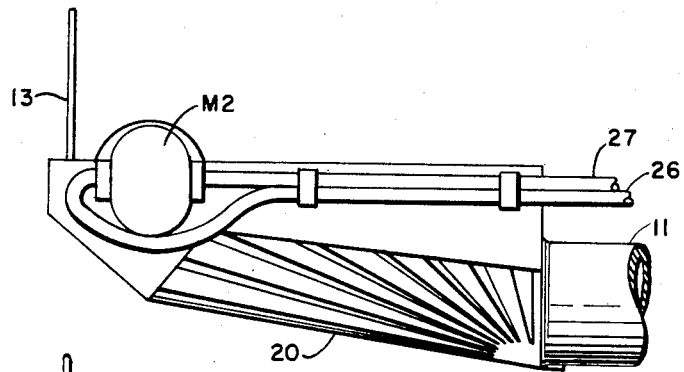
FIG. 3 is a side elevational view of the fruit picker head shown in FIG. 1.

The picker head 10 as shown in FIG. 1 comprises an open top receptacle 12, a reciprocating picker comb 13 mounted adjacent the front end of the receptacle 12 and an auger 14 rotatably mounted just back of the reciprocating comb 13.

The receptacle 12 includes a generally rectangular metal frame 15 having a front wall 16, a back wall 17, side walls 18 and 19, and an open work basket-like bottom 20 depending beneath the frame. The back wall 17 of the frame 15 has an enlarged central portion 21 depending therefrom and provided with a circular opening 21' in which the hollow tube 11 is secured by welding 22 or other suitable means. The front wall 16 is imperforate along its width and its lower portion 16' slopes rearwardly to provide a smooth curved surface which will facilitate the entry of the front end of the picker head among the twigs and branches of a fruit tree. The basket like bottom of the receptacle includes a plurality of separated metal strips diverging from an integral solid channel portion at the entrance of the tube 11 and connecting at spaced areas to the bottom periphery of the frame. The basket bottom 20 is contoured to funnel picked fruit toward the open end of tube 11 when the picker head is positioned with the upper peripheral edge of the frame in a substantially horizontal plane or tilted with the front wall elevated above the rear wall.

Figure 4:
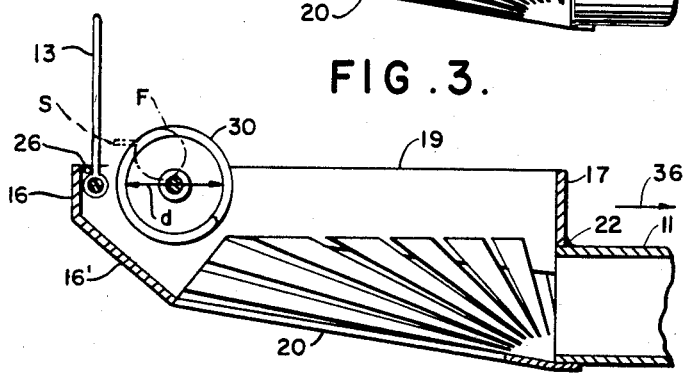
FIG. 4 is a longitudinal vertical sectional view taken on line 4—4 of FIG. 2.

The picker comb 13 includes a support rod 23 to which are secured a plurality of spaced picker fingers 24. The support rod 23 is pivotally mounted in bearings 25 located in opposite side walls 18 and 19 of the picker head frame. The bearings 25 in the opposite sides 18 and 19 are equally spaced rearwardly from the front wall 16 and downwardly from the upper edges of the side walls 18 and 19 so that the support bar 23 is below and parallel with the upper edge of the front wall 16. The picker teeth 24 are spaced apart a distance less than the smallest diameter of the fruit which is to be picked, but far enough to permit the twigs to which the fruit cling to enter between adjacent teeth. When the picker head is being pushed into a tree branch, the picker comb 13 is adapted to rotate rearwardly to a slanted position over the auger 14, thereby decreasing frontal area of contact of the picker head with the tree. However, when the picker head 10 has engaged fruit rearwardly of the picker comb with the fruit bearing twig between a pair of picker teeth as illustrated in FIG. 4 and the picker head is pulled away from the tree branch, the fruit bearing against the rear face of the picker comb and the resistance of the twig to separation from the fruit will rotate the comb upright until it rests against a stop bar 26 extending across the picker head.

In some varieties of citrus trees the fruit grows in bunches or "clusters" and these clusters tend to clog between the picking fingers. In order to eliminate this jamming a provision has been made for the separation of these clusters by the reciprocation of the picker fingers in a forward and backward motion across the auger as indicated by the arrow 27. The reciprocation may be accomplished by suitable drive means M1, such as electrical, hydraulic or pneumatic motors. In situations where the oscillation of the picker fingers is not needed, means (not shown) are provided to shut off the drive means.

The auger 14 includes an auger shaft 28 rotatably mounted in the side walls 18 and 19 just rearwardly of and parallel to the picker comb 13. It is rotatably driven by a hydraulic motor M2 which is supplied with driving fluid through supply and return lines 26 and 27 connected with suitable control valves, and fluid supply not shown. Although an auger with a continuous helix rotating in one direction can be used within the scope of this invention to obtain the desired twisting action on the fruit, the use of a continuous helix reduces the usable width of the picking head. This is because it has been found through trials and experiment that unless extra space is provided beyond the picker fingers 24 at the terminal ends of the auger for the easy escape of the picked fruit, squeezing or crushing of the fruit as well as damage to the tree or foliage results at the ends of the auger.

Accordingly in order to reduce the size of the picking head, without impairing its capacity or effectiveness in picking the fruit, the auger 14 is preferably constructed so that it spirals from opposite ends toward the middle. The preferred auger 14 thus comprises a pair of oppositely and helically wound conveyor flights 29 and 30. These flights comprise rods of equal length uniformly wound to form cylindrical helical coils each having outer and inner ends 31 and 32 respectively and being of a constant internal diameter, $d$, and constant pitch, $p$. The length of the conveyor flights is approximately equal to one-half the total length of the auger. A pair of smaller disks 33 and 34 are fixed to the auger shaft 28 near opposite ends of the shaft just inside of the side walls 18 and 19 respectively, but out of contact therewith. The diameter of the disks is equal to the inside diameter $d$ of the conveyor flights, so that the outer ends 32 of the conveyor flights may be placed over the peripheral surface of one of the disks and welded thereto, with the outer ends 32 of the conveyor flights 29 and 30 secured to disks 33 and 34 respectively, the conveyor flights are mounted to surround the auger shaft 28 in concentric relation thereto and to extend toward the center of the picker head with the inner ends unsupported and lying approximate the center line through the picker head. The motor M2 drives the auger shaft 28 in the direction indicated by the arrow shown on disk 33 (FIG. 1) so that a point anywhere along the top surface of the conveyor flights above the shaft 28 has a direction of motion toward the rear wall 17. The conveyor flights 29 and 30 are wound so that when they are rotated as stated above, the motion exerted on material contacted by the conveyor flights will be toward the center of the auger.

When the picker head is to be used for picking fruit having a diameter ranging from 2½ to 4 inches, the diameter and pitch betwen windings of the auger 14 are both preferably eight inches. The purpose is to have the fruit F drop down between the windings in the auger so as to get the greatest twisting action on the fruit from the spin of the auger (see FIG. 5).

Figure 5:
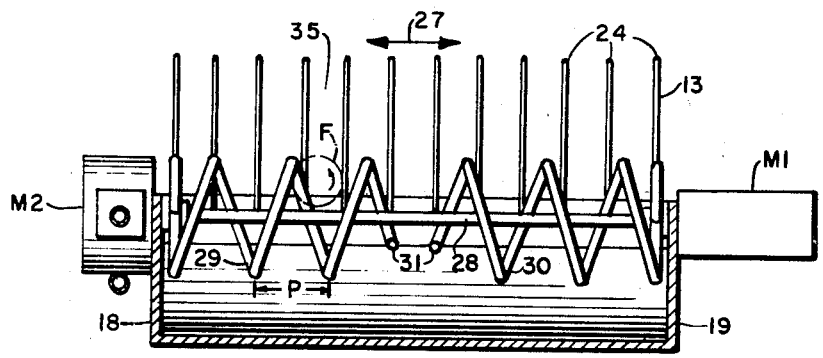
FIG. 5 is a transverse vertical sectional view taken on line 5—5 of FIG. 2.

In FIGS. 4 and 5 a fruit F, having a stem S, is shown engaged by the picker comb 13. The fruit F will be enlarged by the auger as the picker head is lifted and given a twisting motion as indicated by the arrow 35 (shown in FIG. 5). When the picker head is retracted in the direction indicated by the arrow 36 (shown in FIG. 4) the fruit will be pulled from the stem S and will fall into the bottom 20 of the receptacle and roll toward the hollow tube 20.

Figure 6:
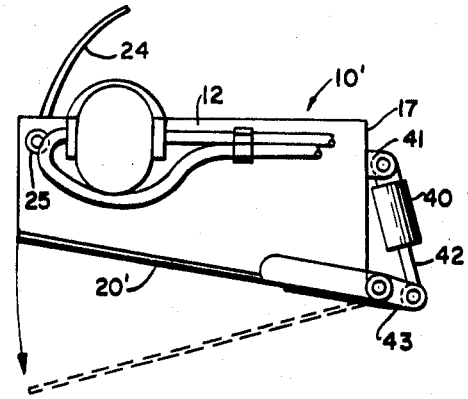
FIG. 6 is a side elevational view of a modified form of the invention.
Figure 7:
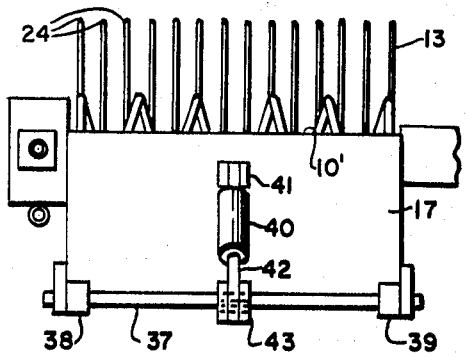
FIG. 7 is a rear elevational view of the modified form of the invention shown in FIG. 6.

Another embodiment of the picker head of this invention is shown in FIGS. 6 and 7. The picker head 10' differs from picker head 10 only as regards the botom of the receptacle 12. In the embodiment shown in FIGS. 6 and 7 the receptacle 12 has a hinged bottom 20' hingedly connected by a hinge shaft 37 secured along its rear edge, to hinge pivot brackets 38 and 39 attached to opposite sides of the receptacle 12. A hydraulic motor having a cylinder 40 pivotally connected to a bearing bracket 41 attached to the rear wall 17 of the picker receptacle and a piston rod 42 pivotally connected to a lever arm 43 on the bottom 20' is provided to open and close the bottom of the receptacle so that fruit may be dumped from the receptacle when it is full.

Figure 8:
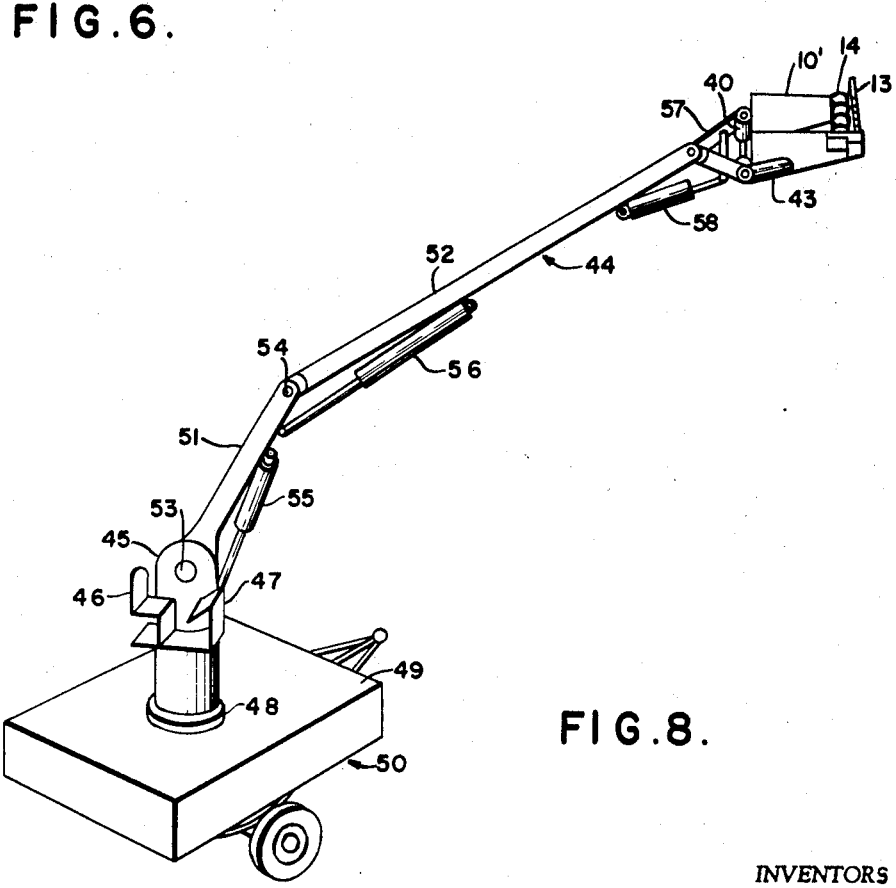
FIG. 8 is a perspective view showing the modified form of the invention shown in FIGS. 6 and 7 mounted on an extensible boom.

In FIG. 8 the picker head 10' is shown mounted on an articulated boom 44 which is pivotally supported at its base end to a pedestal 45. The pedestal 45 supports an operator's chair 46 and control panel 47. The pedestal 45 is mounted on a turntable 48 supported on the load bed 49 of a trailer 50. The turntable 48 is preferably power driven by suitable means (not shown) in a continuous direction of rotation or in the reverse thereof under the control of an operator who may stop the rotation at any desired position. A brake may be provided if required to stop the turntable at the desired position. The boom 44 is shown comprising two articulated sections 51 and 52. Section 51 is pivoted about a horizontal pivot 53 to the pedestal and, section 52 is pivoted about a horizontal pivot 54 to the bottom section 51. Hydraulic motors 55 and 56 comprising pistons and cylinders are respectively connected between pedestal 45 and section 51, and section 51 and section 52 to vertically adjust the bottom section 51 relative to the pedestal, and the upper section 52 relative to the bottom section 51. A yoke 57 pivotally connected about a horizontal pivot at the upper end of boom section 52 supports the picker head 10'. A hydraulic piston and cylinder motor 58 may be suitably connected between the upper boom section 52 and the yoke 57 to adjust the angle of the picker head 10' relative to the boom section 52.

While controls and hydraulic lines to the various motors have not been shown or described they are conventional and may be obtained from dealers in hydraulic motors and controls. Although hydraulic motors have generally been shown it is fully within the scope of this invention that electric, pneumatic or other type motors could be used to cause the desired functions described.

The picker fingers 24 shown in FIG. 1 as being straight can be curved rearwardly as indicated in FIG. 6 to provide less resistance as the picker head is being pushed into the tree branches.

Although this invention has been described as being particularly adapted to pick citrus fruits including oranges, grapefruit and the like, it can also be used to pick other types of fruit.

While in the foregoing there have been described and shown preferred embodiments of the invention, various modifications may become apparent to those skilled in the art to which this invention relates. Accordingly, it is not desired to limit the invention to this disclosure, and various modifications and equivalents may be resorted to, falling within the spirit and scope of the invention as claimed.

We claim:

1. A fruit picker head particularly adapted for picking oranges and the like of a construction to be mounted on an extensible support means, said picker head comprising a fruit collecting receptacle having a bottom, a front wall, a rear wall, connecting side walls, and an open top defined by said front, rear and side walls, a picker comb having a plurality of spaced picker fingers mounted across the open top of said receptacle adjacent said front wall with the picker fingers extending upwardly above said open top, and a rotatable auger mounted across the open top of said receptacle adjacent said picker comb and rearwardly thereof, and power means for rotating said rotatable auger.

2. The picker head set forth in claim 1 wherein said auger includes an auger shaft, a pair of oppositely and helically wound conveyor flights, and means mounting said auger shaft, and wherein said power means rotates said auger in a direction such that the conveyor flights have a conveying motion toward the center of said auger.

3. The picker head set forth in claim 2 wherein said conveyor flights comprise rods of equal length uniformly wound to form cylindrical helical coils each having a pair of ends and being of a constant internal diameter and constant pitch, and of a length equal approximately to one-half the length of said auger, and said means for mounting said flights on said auger shaft comprises a pair of disks secured to said auger shaft adjacent the inside of opposite side walls of said receptacle, said disks being of a diameter equal to the inernal diameter of said helical coils and wherein one end of one said helical coils is secured to the periphery of one of said disks with its other end being free and extending to approximate the center of said auger shaft with the coil surrounding and concentric with said shaft, and wherein one end of the other helical coil is secured in like manner to the other disk.

4. The picker head set forth in claim 1 together with power means for reciprocating said picker comb.

5. The picker head set forth in claim 4 together with means selectively energizing said power means.

6. The picker head set forth in claim 1 wherein said bottom of said receptacle is hinged to one wall thereof together with means for opening and closing said bottom to permit fruit collected in said receptacle to be deposited through said bottom into suitable receiving means.

7. The picker head set forth in claim 1 together with a hollow tube having a pair of ends, and opening in said rear wall, and one end of said hollow tube secured in said opening flush with the inside of said rear wall, and the other end of said tube extending outwardly from said rear wall.

8. The picker head set forth in claim 7 wherein said bottom has a funnel configuration to cause fruit collected in said receptacle to roll by gravity through said hollow tube when said receptacle is elevated and tilted rearwardly.

9. The picker head set forth in claim 8 wherein said hollow tube forms one section of a multisectioned, articulated, extensible support means for said receptacle.

10. A mechanical fruit picking apparatus comprising an extensible support boom and a picker head mounted on one end of said extensible support boom, said picker head comprising a support frame encompassing an opening, picker comb having a plurality of spaced picker fingers mounted on said frame across said opening with the picker fingers extending above said opening, a power driven rotary auger mounted on said frame across said opening parallel and adjacent to said picker comb, said frame being mounted on said boom with the picker comb positioned furthest from the end of said boom and the auger being positioned behind said picker comb in the direction of the end of said boom, and means attached to said frame beneath said opening for receiving fruit picked by said picker head, and means for actuating said extensible boom to lift said picker head into a tree under ripe fruit so that said picker fingers engage said fruit near the place where the fruit joins its stem, and to retract said boom from said tree with an outward pull on said fruit.

11. A picker head for picking fruit and the like from trees comprising a frame encompassing an opening, a picker comb having a plurality of spaced picker fingers mounted on said frame across said opening with the picker fingers extending above said opening, a power driven auger mounted on said frame across said opening parallel and adjacent to said picker comb and means attached to said frame beneath said opening for receiving fruit picked by said picker head.

12. The picker head set forth in claim 1 wherein said auger includes an auger shaft and a pair of oppositely and helically wound conveyor flights mounted thereon in coaxial alignment with said shaft, and wherein said power means rotates said auger in a direction such that points on the top of said auger above said shaft are moving rearwardly away from said front wall, and wherein the helical conveyor flights are wound so that as the auger turns in said direction the conveying motion of the conveyor flights will be toward the center of the auger.

13. The picker head set forth in claim 4 wherein the pitch between turns of said helically wound conveyor flights is greater than the diameter of the fruit which is to be picked, so that the fruit can fall between the turns of the conveyor flights.

14. The picker head set forth in claim 13 wherein the pitch between turns and the diameter of the auger is within the range of from 2 to 4 times the average diameter of the fruit to be picked.

References Cited

UNITED STATES PATENTS 487,931   12/1892   Mays _____ 56—337

LOUIS G. MANCENE, Primary Examiner

J. A. OLIFF, Assistant Examiner